United States Patent
Tang

(10) Patent No.: US 10,503,033 B2
(45) Date of Patent: Dec. 10, 2019

(54) BLUE PHASE LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 79 days.

(21) Appl. No.: 15/981,012

(22) Filed: May 16, 2018

(65) Prior Publication Data
US 2018/0267372 A1    Sep. 20, 2018

Related U.S. Application Data

(62) Division of application No. 14/901,689, filed on Dec. 28, 2015, now Pat. No. 10,012,876.

(51) Int. Cl.
*G02F 1/1343* (2006.01)
*G02F 1/137* (2006.01)

(52) U.S. Cl.
CPC ........ *G02F 1/134363* (2013.01); *G02F 1/137* (2013.01); *G02F 2001/13793* (2013.01); *G02F 2203/01* (2013.01); *G02F 2203/02* (2013.01)

(58) Field of Classification Search
CPC ............... G02F 1/134363; G02F 1/137; G02F 2001/13793; G02F 2203/01; G02F 2203/02; G02F 1/134309; G02F 1/1333; G02F 1/133553; G09G 3/3614
See application file for complete search history.

(56) References Cited

U.S. PATENT DOCUMENTS

| | | | | |
|---|---|---|---|---|
| 2013/0271679 A1* | 10/2013 | Sakamoto | ......... | G02F 1/133514 349/33 |
| 2014/0307206 A1* | 10/2014 | Xie | .................... | G02F 1/133555 349/96 |
| 2017/0082883 A1* | 3/2017 | Tang | .................... | G02F 1/13394 |

* cited by examiner

*Primary Examiner* — Huyen L Ngo
(74) *Attorney, Agent, or Firm* — Andrew C. Cheng

(57) ABSTRACT

A blue phase liquid crystal display panel and a liquid crystal display device are disclosed, including a first and a second substrates disposed at an interval and parallel. Blue phase liquid crystal is disposed between the first and second substrates. The first substrate includes a first base. The second substrate includes a second base. The blue phase liquid crystal display panel includes a transmissive display region having multiple first base platforms, multiple first electrodes, each of which is disposed on each of the first base platform, and second electrodes disposed on the first base and the second base. A reflective display region has fourth electrodes only disposed on the second base. The first substrate is provided with a reflective layer corresponding to the reflective display region. When light passes through the transmissive display region and the reflective display region, phase delays of the light in the two regions are identical.

6 Claims, 5 Drawing Sheets

BLUE PHASE LIQUID CRYSTAL DISPLAY PANEL AND LIQUID CRYSTAL DISPLAY DEVICE

CROSS REFERENCE TO RELATED APPLICATIONS

This is a divisional application of co-pending U.S. patent application Ser. No. 14/901,689, filed on Dec. 28, 2015, which is a national stage of PCT Application No. PCT/CN2015/093575, filed on Nov. 2, 2015, claiming foreign priority of Chinese Patent Application No. 201510700636.1, filed on Oct. 23, 2015.

1. FIELD OF THE INVENTION

The present invention relates to a liquid crystal display technology field, and more particularly to a blue phase liquid crystal display panel and a liquid crystal display device.

2. DESCRIPTION OF THE PRIOR ART

A blue phase is one kind of liquid crystal phase appeared between the chiral nematic phase and the isotropic phase and having a very narrow temperature range. Comparing to the liquid crystal material widely used in the conventional liquid crystal display, the blue phase liquid crystal has four outstanding advantages:

(1) A response time of the blue phase liquid crystal is within submillisecond so that the liquid crystal display device can not only achieve a color timing display, but also reduce a dynamic fuzzy of a moving image. Besides, a resolution and an optical efficiency of the color timing display are three times of a normal display;

(2) The blue phase liquid crystal does not require an alignment layer so as to simplify the manufacturing cost and reducing the cost;

(3) In a dark state, the blue phase liquid crystal is optically isotropic so that a blue phase liquid crystal display device has a wide viewing angle and is very symmetric; and (4) When a thickness of a blue phase liquid crystal cell is greater than a penetration depth of an electric field, the influence transmittance by a change of the blue phase liquid crystal cell can be omitted. The above property is suitable for a large screen or a single panel liquid crystal display device.

However, in the conventional art, the blue phase liquid crystal faces a problem of too large driving voltage. Currently, an improved blue phase liquid crystal material is used or optimizing a structure of an electrode to remedy this problem.

However, the improved blue phase liquid crystal material is usually a blue phase liquid crystal material having a large Kerr constant. The above method relates to a complex process of synthesis of the blue phase liquid crystal material. For example, manufacturing a stable blue phase liquid crystal material requires considering a series of factors of monomer, photo initiator, and synthesis conditions. Accordingly, the development cost is very expensive. The method of optimizing a structure of an electrode utilizes an IPS (In-plane Switching) structure for driving, and a penetration depth of a lateral electric field generated by parallel electrodes is limited, which requires a higher driving voltage. Therefore, the blue phase liquid crystal display technology using the IPS driving method still needs to be improved.

SUMMARY OF THE INVENTION

The main technology problem solved by the present invention is to provide a blue phase liquid crystal display panel and a liquid crystal display device, which can reduce a driving voltage of the liquid crystal display panel, and realize an identical phase delay of a reflective display region and a transmissive display region of a blue phase liquid crystal display panel.

In order to solve the above technology problem, the present invention provides a blue phase liquid crystal display panel, comprising:

a first substrate and a second substrate which are disposed at an interval and are parallel, and blue phase liquid crystals disposed between the first substrate and the second substrate, wherein the first substrate includes a first base, the second substrate includes a second base, and the blue phase liquid crystal display panel includes multiple transmissive display regions and multiple reflective display regions;

the transmissive display region of the blue phase liquid crystal display panel includes multiple first base platforms sequentially disposed at a side of the first base which is adjacent to the second substrate, multiple first electrodes, and multiple second electrodes disposed on the first base and the second base, wherein the multiple first electrodes and the multiple second electrodes are disposed alternately on different horizontal planes in order to form a first horizontal electric field;

the reflective display region of the blue phase liquid crystal display panel includes a second base platform disposed on the side of the first base which is adjacent to the second substrate, multiple third electrodes, and multiple fourth electrodes disposed on the first base or the second base in order to form a second electric field, wherein the first substrate is provided with a reflective layer;

when lights respectively pass through the transmissive display region and the reflective display region, phase delays of the lights are identical;

wherein multiple transmissive display regions and multiple reflective display regions are disposed alternately and at intervals;

wherein each of the multiple first base platforms is a protruding platform, the multiple first electrodes are sequentially and correspondingly disposed on the multiple first base platforms; the multiple second electrodes are further disposed on the first base and a second base, and are disposed alternately with the first electrodes in a horizontal direction, a horizontal spacing of adjacent first electrode and second electrode is L1; and a second base platform disposed on the side of the first base adjacent to the second substrate is an entire protruding platform; multiple third electrodes are evenly distributed on the second base platform, multiple fourth electrodes are further disposed on the second base, and are disposed alternately with the third electrodes in a horizontal direction, a spacing of adjacent third electrode and fourth electrode is M1.

In order to solve the above technology problem, the present invention also provides a blue phase liquid crystal display panel, comprising:

a first substrate and a second substrate which are disposed at an interval and are parallel, and blue phase liquid crystals disposed between the first substrate and the second substrate, wherein the first substrate includes a first base, the second substrate includes a second base, and the blue phase liquid crystal display panel includes multiple transmissive display regions and multiple reflective display regions;

the transmissive display region of the blue phase liquid crystal display panel includes multiple first base platforms sequentially disposed at a side of the first base which is adjacent to the second substrate, multiple first electrodes, and multiple second electrodes disposed on the first base and the second base, wherein the multiple first electrodes and the multiple second electrodes are disposed alternately on different horizontal planes in order to form a first horizontal electric field;

the reflective display region of the blue phase liquid crystal display panel includes a second base platform disposed on the side of the first base which is adjacent to the second substrate, multiple third electrodes, and multiple fourth electrodes disposed on the first base or the second base in order to form a second electric field, wherein the first substrate is provided with a reflective layer; and when lights respectively pass through the transmissive display region and the reflective display region, phase delays of the lights are identical.

Wherein the multiple transmissive display regions and multiple reflective display regions are disposed alternately and at intervals.

Wherein each of the multiple first base platforms is a protruding platform, the multiple first electrodes are sequentially and correspondingly disposed on the multiple first base platforms; the multiple second electrodes are further disposed on the first base and a second base, and are disposed alternately with the first electrodes in a horizontal direction, a horizontal spacing of adjacent first electrode and second electrode is L1; and a second base platform disposed on the side of the first base adjacent to the second substrate is an entire protruding platform; multiple third electrodes are evenly distributed on the second base platform, multiple fourth electrodes are further disposed on the second base, and are disposed alternately with the third electrodes in a horizontal direction, a spacing of adjacent third electrode and fourth electrode is M1.

Wherein a distance D1 between the first electrode and the first base and a distance d1 between the third electrode and the second base exist a relationship: $-0.5 \ \mu m \leq D1-d1 \leq 0.5 \ \mu m$; each of the spacing L1 and the spacing M1 is greater than or equal to 1.5 μm.

Wherein electric signal polarities applied on the first electrodes are the same; electric signal polarities applied on the second electrodes are the same, and are opposite to the electric signal polarities applied on the first electrodes; electric signal polarities applied on the third electrodes are the same; electric signal polarities applied on the fourth electrodes are the same, and are opposite to the electric signal polarities applied on the third electrodes.

Wherein electric signal polarities applied on adjacent first electrodes are opposite, electric signal polarities applied on the second electrodes are the same, and each second electrodes is disposed between two adjacent first electrodes being applied on opposite electric signal polarities; electric signal polarities applied on adjacent third electrodes are opposite, electric signal polarities applied on the fourth electrodes are the same, and each fourth electrode is disposed between two adjacent third electrodes being applied on opposite electric signal polarities; a distance D1 between the first electrode and the first base and a distance d1 between the third electrode and the second base exist a relationship: D1=d1.

Wherein each of the multiple first base platforms is a protruding platform, the multiple first electrodes are sequentially and correspondingly disposed on the multiple first base platforms; multiple second electrodes are further disposed on the first base and the second base, and are disposed alternately with the first electrodes in a horizontal direction, a horizontal spacing between adjacent first electrode and second electrode is L2; and the second base platforms disposed on the side of the first base which is adjacent to the second substrate includes multiple protruding platforms, the multiple third electrodes are respectively and correspondingly disposed on the multiple protruding platforms; multiple fourth electrodes are further disposed on the first base, and are disposed alternately with the third electrodes in a horizontal direction, a spacing between adjacent third electrode and fourth electrode is M2.

Wherein a distance D2 between the first electrode and the first base and a distance d2 between the third electrode and the second base exist a relationship: $-0.5 \ \mu m \leq D2-d2 \leq 0.5 \ \mu m$; each of the spacing L2 and the spacing M2 is greater than or equal to 1.5 μm.

Wherein electric signal polarities applied on the first electrodes are the same; electric signal polarities applied on the second electrodes are the same, and are opposite to the electric signal polarities applied on the first electrodes; electric signal polarities applied on the third electrodes are the same; electric signal polarities applied on the fourth electrodes are the same, and are opposite to the electric signal polarities applied on the third electrodes.

Wherein electric signal polarities applied on adjacent first electrodes are opposite; electric signal polarities applied on the second electrodes are the same, and each second electrodes 66 is disposed between two adjacent first electrodes being applied on opposite electric signal polarities; electric signal polarities applied on adjacent third electrodes are opposite; electric signal polarities applied on the fourth electrodes are the same, and each fourth electrodes is disposed between two adjacent third electrodes being applied on opposite electric signal polarities; a distance D2 between the first electrode and the first base and a distance d2 between the third electrode and the second base exist a relationship: D2>d2.

In order to solve the above technology problem, the present invention also provides a liquid crystal display device including a blue phase liquid crystal display panel, and the blue phase liquid crystal display panel comprises:

a first substrate and a second substrate which are disposed at an interval and are parallel, and blue phase liquid crystals disposed between the first substrate and the second substrate, wherein the first substrate includes a first base, the second substrate includes a second base, and the blue phase liquid crystal display panel includes a transmissive display region and a reflective display region;

the transmissive display region of the blue phase liquid crystal display panel includes multiple first base platforms sequentially disposed at a side of the first base which is adjacent to the second substrate, multiple first electrodes, and multiple second electrodes disposed on the first base and the second base, wherein the multiple first electrodes and the multiple second electrodes are disposed alternately on different horizontal planes in order to form a first horizontal electric field;

the reflective display region of the blue phase liquid crystal display panel includes a second base platform disposed on the side of the first base which is adjacent to the second substrate, multiple third electrodes, and multiple fourth electrodes disposed on the first base or the second base in order to form a second electric field, wherein the first substrate is provided with a reflective layer; and when lights respectively pass through the transmissive display region and the reflective display region, phase delays of the lights are identical.

Wherein the multiple transmissive display regions and multiple reflective display regions are disposed alternately and at intervals.

Wherein each of the multiple first base platforms is a protruding platform, the multiple first electrodes are sequentially and correspondingly disposed on the multiple first base platforms; the multiple second electrodes are further disposed on the first base and a second base, and are disposed alternately with the first electrodes in a horizontal direction, a horizontal spacing of adjacent first electrode and second electrode is L1; and a second base platform disposed on the side of the first base adjacent to the second substrate is an entire protruding platform; multiple third electrodes are evenly distributed on the second base platform, multiple fourth electrodes are further disposed on the second base, and are disposed alternately with the third electrodes in a horizontal direction, a spacing of adjacent third electrode and fourth electrode is M1.

Wherein a distance D1 between the first electrode and the first base and a distance d1 between the third electrode and the second base exist a relationship: $-0.5\ \mu m \leq D1-d1 \leq 0.5\ \mu m$; each of the spacing L1 and the spacing M1 is greater than or equal to 1.5 μm.

Wherein electric signal polarities applied on the first electrodes are the same; electric signal polarities applied on the second electrodes are the same, and are opposite to the electric signal polarities applied on the first electrodes; electric signal polarities applied on the third electrodes are the same; electric signal polarities applied on the fourth electrodes are the same, and are opposite to the electric signal polarities applied on the third electrodes.

Wherein electric signal polarities applied on adjacent first electrodes are opposite, electric signal polarities applied on the second electrodes are the same, and each second electrodes is disposed between two adjacent first electrodes being applied on opposite electric signal polarities; electric signal polarities applied on adjacent third electrodes are opposite, electric signal polarities applied on the fourth electrodes are the same, and each fourth electrode is disposed between two adjacent third electrodes being applied on opposite electric signal polarities; a distance D1 between the first electrode and the first base and a distance d1 between the third electrode and the second base exist a relationship: D1=d1.

Wherein each of the multiple first base platforms is a protruding platform, the multiple first electrodes are sequentially and correspondingly disposed on the multiple first base platforms; multiple second electrodes are further disposed on the first base and the second base, and are disposed alternately with the first electrodes in a horizontal direction, a horizontal spacing between adjacent first electrode and second electrode is L2; and the second base platforms disposed on the side of the first base which is adjacent to the second substrate includes multiple protruding platforms, the multiple third electrodes are respectively and correspondingly disposed on the multiple protruding platforms; multiple fourth electrodes are further disposed on the first base, and are disposed alternately with the third electrodes in a horizontal direction, a spacing between adjacent third electrode and fourth electrode is M2.

Wherein a distance D2 between the first electrode and the first base and a distance d2 between the third electrode and the second base exist a relationship: $-0.5\ \mu m \leq D2-d2 \leq 0.5\ \mu m$; each of the spacing L2 and the spacing M2 is greater than or equal to 1.5 μm.

Wherein electric signal polarities applied on the first electrodes are the same; electric signal polarities applied on the second electrodes are the same, and are opposite to the electric signal polarities applied on the first electrodes; electric signal polarities applied on the third electrodes are the same; electric signal polarities applied on the fourth electrodes are the same, and are opposite to the electric signal polarities applied on the third electrodes.

Wherein electric signal polarities applied on adjacent first electrodes are opposite; electric signal polarities applied on the second electrodes are the same, and each second electrodes 66 is disposed between two adjacent first electrodes being applied on opposite electric signal polarities; electric signal polarities applied on adjacent third electrodes are opposite; electric signal polarities applied on the fourth electrodes are the same, and each fourth electrodes is disposed between two adjacent third electrodes being applied on opposite electric signal polarities; a distance D2 between the first electrode and the first base and a distance d2 between the third electrode and the second base exist a relationship: D2>d2.

The beneficial effects of the present invention are: comparing with the conventional art, In the blue phase liquid crystal display panel and the liquid crystal display device, in the transmissive display region, the second electrodes are disposed on the first base and the second base, the first electrodes are provided on the first base, and the first electrodes and the second electrodes are disposed alternately in order to form an oblique electric field; in the reflective display region, the third electrodes are disposed on the first base, the fourth electrodes are disposed on the first base or the second base in order to form an oblique electric field so as to reduce the driving voltage of the blue phase liquid crystal display panel. Because the second electrodes are disposed on the first base and the second base in the transmissive region, and in the reflective display region, the fourth electrodes are only disposed on the first base or the second base, the phase delays of the two regions are identical.

DETAILED DESCRIPTION OF THE PREFERRED EMBODIMENT

The following content combines with the drawings and the embodiment for describing the present invention in detail.

Figure 1:
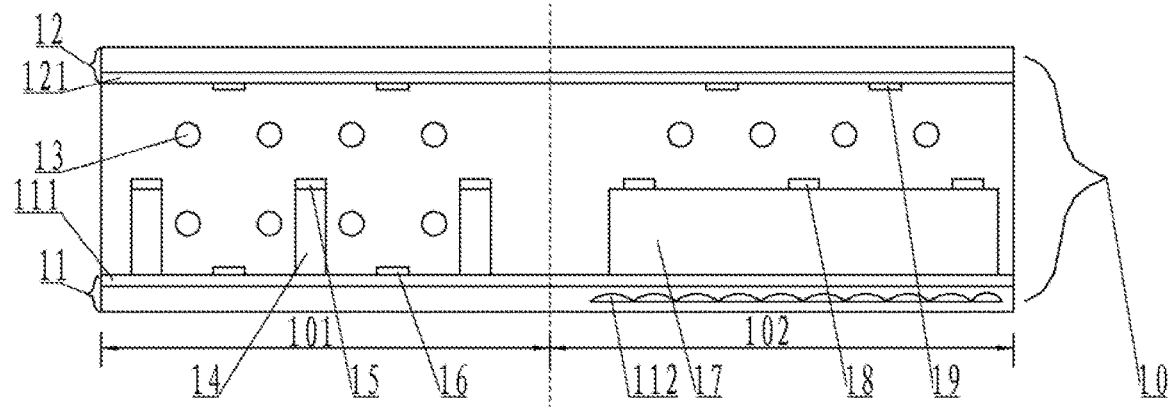
FIG. 1 is a schematic structure diagram of a blue phase liquid crystal display panel according to a first embodiment of the present invention.

With reference to FIG. 1, a first embodiment of the blue phase liquid crystal display panel includes: a first substrate 11 and a second substrate 12 which are disposed at an interval and are parallel, and blue phase liquid crystals 13 disposed between the first substrate 11 and the second substrate 12. The first substrate 11 includes a first base 111, and the second substrate 12 includes a second base 121. The blue phase liquid crystal display panel 10 includes a transmissive display region 101 and a reflective display region 102.

The transmissive display region 101 of the blue phase liquid crystal display panel 10 includes multiple first base platforms 14 sequentially disposed at a side of the first base 111 which is adjacent to the second substrate 12, multiple first electrodes 15, and multiple second electrodes 16 disposed on the first base 111 and the second base 121. The multiple first electrodes 15 and the multiple second electrodes 16 are disposed alternately on different horizontal planes in order to form a first horizontal electric field.

The reflective display region 102 of the blue phase liquid crystal display panel 10 includes a second base platform 17 disposed on the side of the first base 111 which is adjacent to the second substrate 12, multiple third electrodes 18, and multiple fourth electrodes 19 disposed on the first base 111 or the second base 121 in order to form a second electric field. The first substrate 11 is provided with a reflective layer 112.

Wherein when lights respectively pass through the transmissive display region 101 and the reflective display region 102, phase delays of the lights are identical.

It can be understood that the reflective layer 112 can be disposed at a normal design location which is in the first substrate 11 or above the first substrate 11, and the present invention is not limited.

In the present invention, on the first base 111 of the first substrate 11, regular structures not shown in the figures such as a scanning line, a data line, a semiconductor layer and an insulation layer can be provided. Because these structures are belong to the conventional art, the present does not describe them in detail for focusing on the invention point. Similarly, on the second base 121 of the second substrate 12 of the present invention, regular structures not shown in the figures such as a black matrix, a RGB color resist layer, a planarization layer and a supporting column can be provided. Because these structures are belong to the conventional art and not affecting an illustration for the electrodes of the present invention, the present does not describe them in detail.

Figure 2:
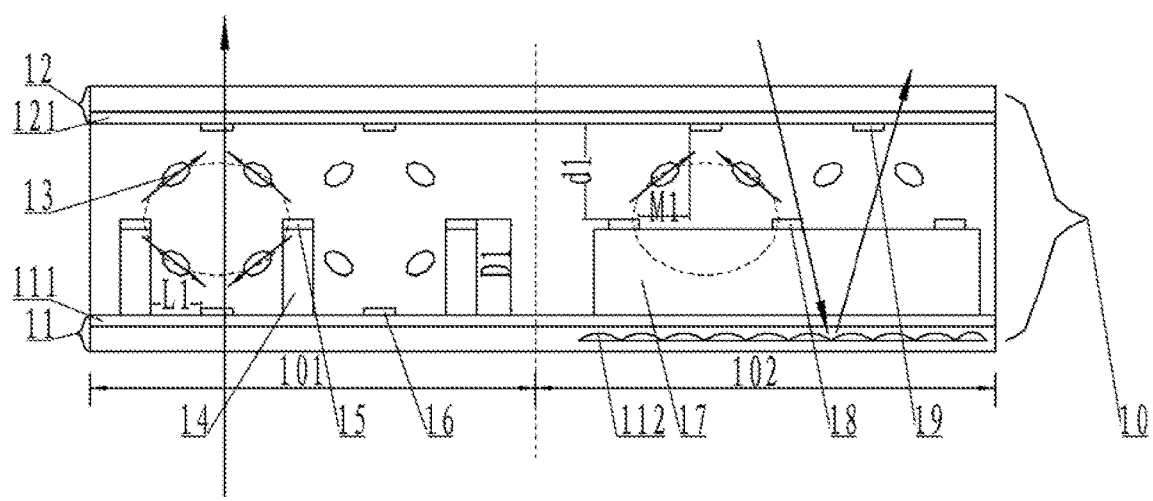
FIG. 2 is a schematic structure diagram of a blue phase liquid crystal display panel when a voltage is applied on electrodes in the first embodiment.

The blue phase liquid crystals are evenly distributed in the display panel. When a voltage is not applied, the blue phase liquid crystal display panel 10 is in a dark state. As shown in FIG. 2, when a voltage is applied on the electrodes, an electric field is formed between the first electrode 15 and the second electrode 16 in the transmissive display region 101, and an electric field is formed between the third electrode 18 and the fourth electrode 19 in the reflective display region 102 such that the blue phase liquid crystals 13 form an optical anisotropy so as to reduce a driving voltage of the blue phase display panel. By controlling a height of the first electrode 15 in the transmissive display region 101, a phase delay of the transmissive display region 101 can be twice of a phase delay of the reflective display region 102. That is, a phase delay of an external light that passing through the reflective display region 102 from the second substrate 12, reaching the reflective layer 112 on the first substrate 11, being reflected back and passing through the reflective display region 102, and reaching the second substrate 12 is identical with a phase delay of a light of an internal backlight source that passing through the transmissive display region 101 from the first substrate 11 and reaching the second substrate 12. When a same voltage is applied on the transmissive display region 101 and the reflective display region 102, the transmissive display region 101 and the reflective display region 102 have a same electro-optical property.

Figure 3:
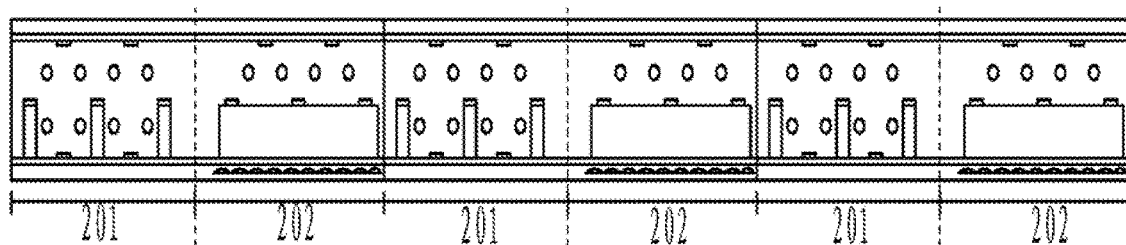
FIG. 3 is a schematic structure diagram of a blue phase liquid crystal display panel according to a second embodiment of the present invention.

With reference to FIG. 3, FIG. 3 is a schematic structure diagram of a blue phase liquid crystal display panel 20 according to a second embodiment of the present invention. Based on the first embodiment, multiple transmissive display regions 201 and multiple reflective display regions 202 are disposed alternately and at intervals.

Figure 4:
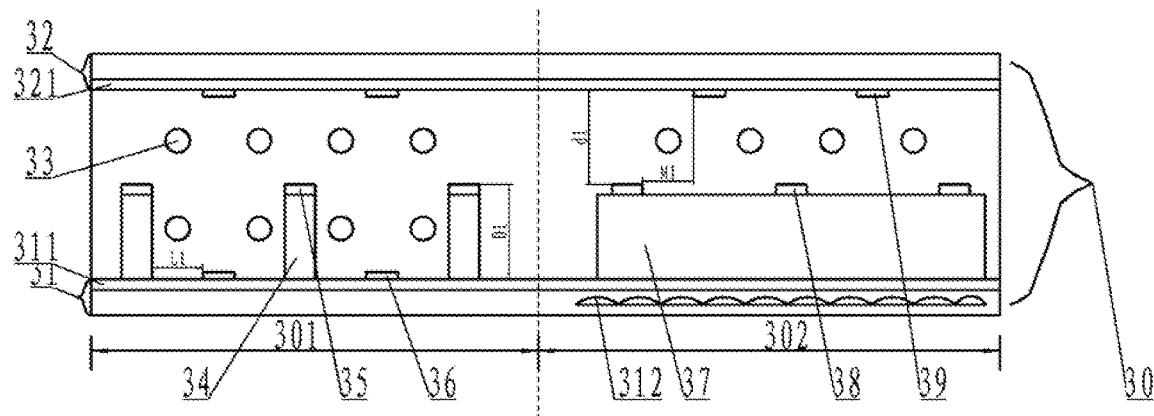
FIG. 4 is a schematic structure diagram of a blue phase liquid crystal display panel according to a third embodiment of the present invention.

With reference to FIG. 4, FIG. 4 is a schematic structure diagram of a blue phase liquid crystal display panel 30 according to a third embodiment of the present invention. Based on the first embodiment, each of the multiple first base platforms 34 is a protruding platform. Multiple first electrodes 35 are sequentially and correspondingly disposed on the multiple first base platforms 34. Multiple second electrodes 36 are further disposed on a first base 311 and a second base 321, and are disposed alternately with the first electrodes 35 in a horizontal direction. A horizontal spacing of adjacent first electrode 35 and second electrode 36 is L1. A second base platform 37 disposed on the side of the first base 311 adjacent to the second substrate 32 is an entire protruding platform. Multiple third electrodes 38 are evenly distributed on the second base platform. Multiple fourth electrodes 39 are further disposed on the second base 321, and are disposed alternately with the third electrodes 38 in a horizontal direction. A spacing of adjacent third electrode 38 and fourth electrode 39 is M1.

In the transmissive region 301, the multiple first base platforms 34 form multiple protruding platforms by etching to form gaps among the first electrodes on a spacer layer. In the reflective display region 302, the spacer layer is not etched so that the second base platform 37 is an entire protruding platform.

Wherein a distance D1 between the first electrode 35 and the first base 311 and a distance d1 between the third electrode 38 and the second base 321 have a relationship: $-0.5\ \mu m \leq D1-d1 \leq 0.5\ \mu m$. Besides, each of the spacing L1 and the spacing M1 is greater than or equal to $1.5\ \mu m$.

Wherein electric signal polarities applied on the first electrodes 35 are the same. Electric signal polarities applied on the second electrodes 36 are the same, and are opposite to the electric signal polarities applied on the first electrodes 35. Electric signal polarities applied on the third electrodes 38 are the same. Electric signal polarities applied on the fourth electrodes 39 are the same, and are opposite to the electric signal polarities applied on the third electrodes 38.

Figure 5:
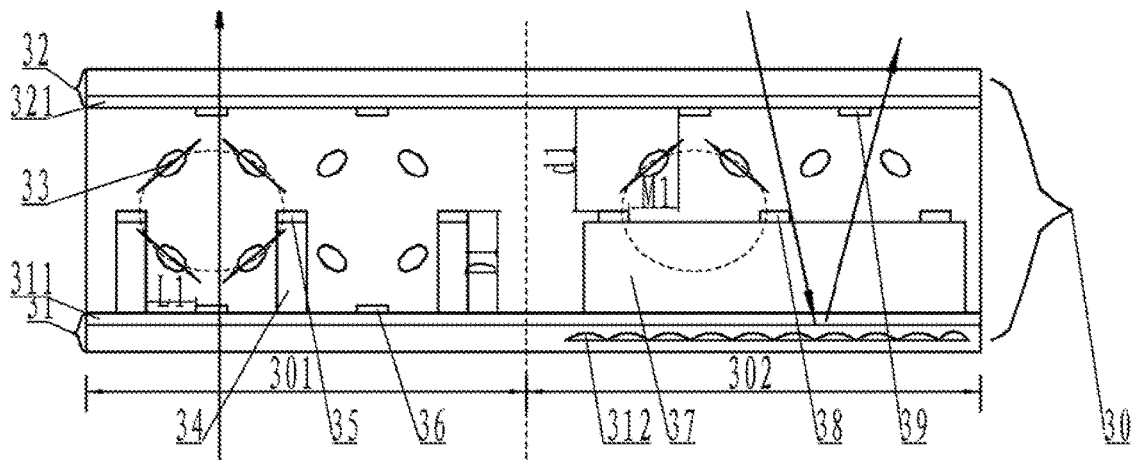
FIG. 5 is a schematic structure diagram of a blue phase liquid crystal display panel when a voltage is applied on electrodes in the third embodiment.

The blue phase liquid crystals 33 are evenly distributed in the display panel. When a voltage is not applied, the blue phase liquid crystal display panel 30 is in a dark state. As shown in FIG. 5, when a voltage is applied on the electrodes, an electric field is formed between the first electrode 35 and the second electrode 36 in the transmissive display region 301, and an electric field is formed between the third electrode 38 and the fourth electrode 39 in the reflective display region 302 such that the blue phase liquid crystals 33 form an optical anisotropy so as to reduce a driving voltage of the blue phase display panel. By controlling a height D1 of the first electrode 35 in the transmissive display region 301 to be within a range of −0.5 μm≤D1−d1≤0.5 μm, and because the second base platform 37 is an entire protruding platform, in the reflective region 302, only about one half of the space is filled with the blue phase liquid crystals so that a phase delay of the transmissive display region 301 can be twice of a phase delay of the reflective display region 302. That is, a phase delay of an external light that passing through the reflective display region 302 from the second substrate 32, reaching the first substrate 31, being reflected back and passing through the reflective display region 302, and reaching the second substrate 32 is identical with a phase delay of a light of an internal backlight source that passing through the transmissive display region 301 from the first substrate 31 and reaching the second substrate 32. When a same voltage is applied on the transmissive display region 301 and the reflective display region 302, the transmissive display region 301 and the reflective display region 302 have a same electro-optical property.

The present embodiment can also combine with the second embodiment of the blue phase liquid crystal display panel of the present invention.

Figure 6:
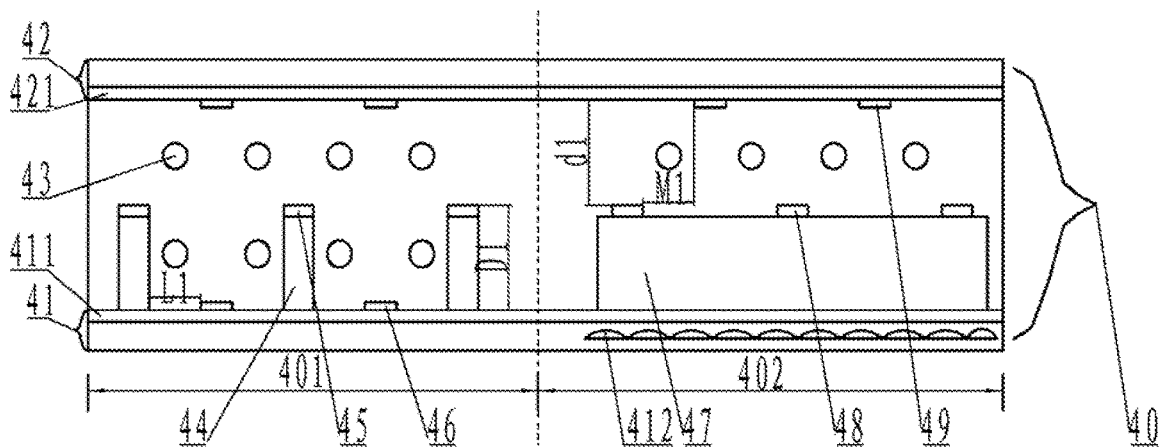
FIG. 6 is a schematic structure diagram of a blue phase liquid crystal display panel according to a fourth embodiment of the present invention.

With reference to FIG. 6, FIG. 6 is a schematic structure diagram of a blue phase liquid crystal display panel 40 according to a fourth embodiment of the present invention. The difference comparing with respect to the third embodiment is: electric signal polarities applied on adjacent first electrodes 45 are opposite, electric signal polarities applied on the second electrodes 46 are the same, and each second electrodes 46 is disposed between two adjacent first electrodes 45 being applied on opposite electric signal polarities. Electric signal polarities applied on adjacent third electrodes 48 are opposite. Electric signal polarities applied on the fourth electrodes 49 are the same, and each fourth electrode 49 is disposed between two adjacent third electrodes 48 being applied on opposite electric signal polarities. A distance D1 between the first electrode 45 and the first base 411 and a distance d1 between the third electrode 48 and the second base 421 are equal. Each of the distance D1 and the distance d1 is equal to one half of a distance between the first base 411 and the second base 421 (one half of a liquid crystal cell thickness).

Figure 7:
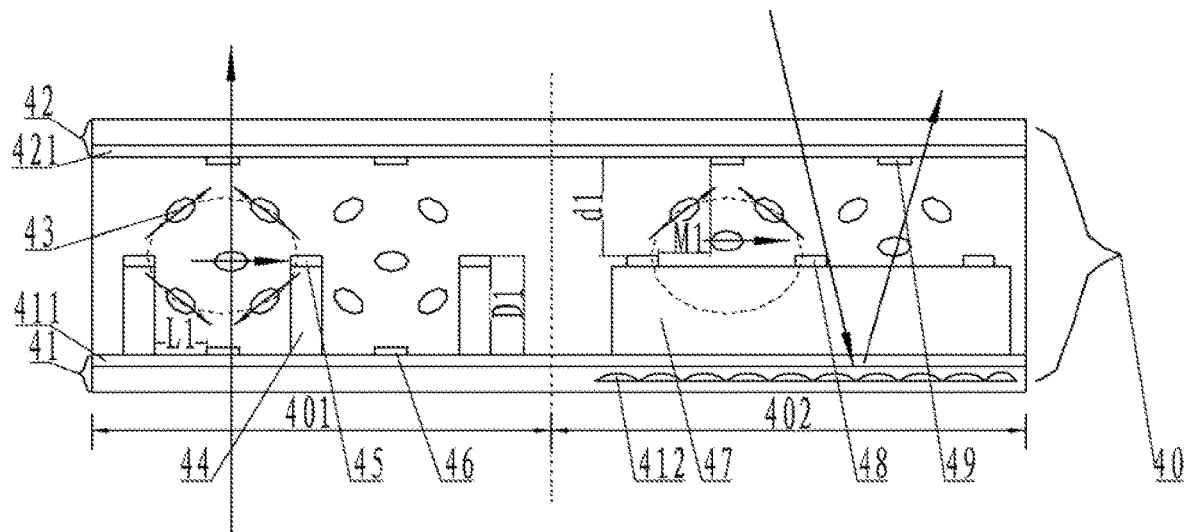
FIG. 7 is a schematic structure diagram of a blue phase liquid crystal display panel when a voltage is applied on electrodes in the fourth embodiment.

The blue phase liquid crystals 43 are evenly distributed in the display panel. When a voltage is not applied, the blue phase liquid crystal display panel 40 is in a dark state. As shown in FIG. 7, when a voltage is applied on the electrodes, an electric field is formed between the first electrode 45 and the second electrode 46 in the transmissive display region 401, an electric field is formed between adjacent first electrodes 45, an electric field is formed between the third electrode 48 and the fourth electrode 49 in the reflective display region 402, and an electric field is formed between adjacent third electrodes 48 such that the blue phase liquid crystals 43 form an optical anisotropy so as to reduce a driving voltage of the blue phase display panel. By controlling a height D1 of the first electrode 45 in the transmissive display region 401 to be D1=d1, and because the second base platform 47 is an entire protruding platform, in the reflective region 402, only about one half of the space is filled with the blue phase liquid crystals 43 so that a phase delay of the transmissive display region 401 can be twice of a phase delay of the reflective display region 402. That is, a phase delay of an external light that passing through the reflective display region 402 from the second substrate 42, reaching the reflective layer 412 of the first substrate 41, being reflected back and passing through the reflective display region 402, and reaching the second substrate 42 is identical with a phase delay of a light of an internal backlight source that passing through the transmissive display region 401 from the first substrate 41 and reaching the second substrate 42. When a same voltage is applied on the transmissive display region 401 and the reflective display region 402, the transmissive display region 401 and the reflective display region 402 have a same electro-optical property.

The present embodiment can also combine with the second embodiment of the blue phase liquid crystal display panel of the present invention.

Figure 8:
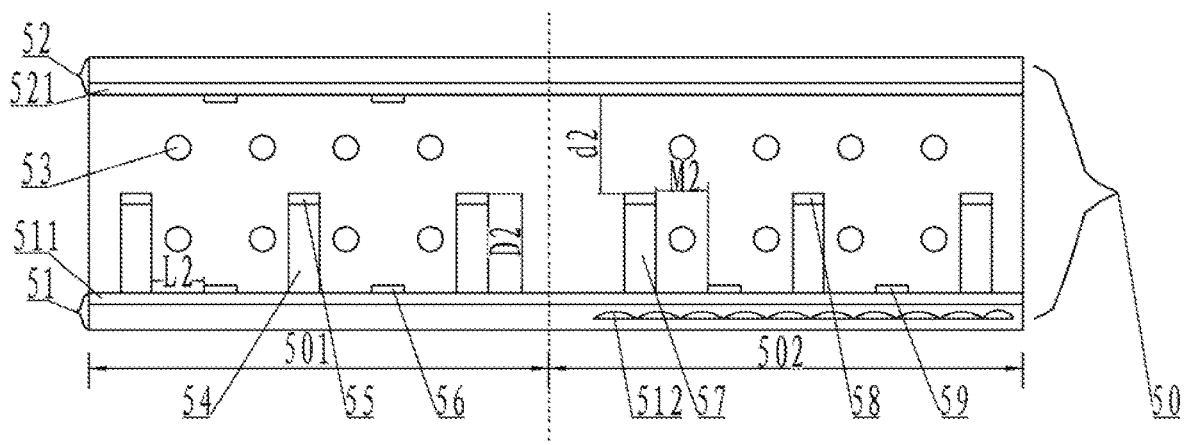
FIG. 8 is a schematic structure diagram of a blue phase liquid crystal display panel according to a fifth embodiment of the present invention.

With reference to FIG. 8, FIG. 8 is a schematic structure diagram of a blue phase liquid crystal display panel 50 according to a fifth embodiment of the present invention. Based on the first embodiment, each of the multiple first base platforms 54 is a protruding platform. Multiple first electrodes 55 are sequentially and correspondingly disposed on the multiple first base platforms 54. Multiple second electrodes 56 are further disposed on the first base 511 and the second base 521, and are disposed alternately with the first electrodes 55 in a horizontal direction. A horizontal spacing between adjacent first electrode 55 and second electrode 56 is L2. The second base platforms 57 disposed on the side of the first base 511 which is adjacent to the second substrate 52 includes multiple protruding platforms. Multiple third electrodes 58 are respectively and correspondingly disposed on the multiple protruding platforms. Multiple fourth electrodes 59 are further disposed on the first base 511, and are disposed alternately with the third electrodes 58 in a horizontal direction. A spacing between adjacent third electrode 58 and fourth electrode 59 is M2.

Wherein a distance D2 between the first electrode 55 and the first base 511 and a distance d2 between the third electrode 58 and the second base 521 have a relationship: −0.5 μm≤D2−d2≤0.5 μm. Besides, each of the spacing L2 and the spacing M2 is greater than or equal to 1.5 μm.

Wherein electric signal polarities applied on the first electrodes 55 are the same. Electric signal polarities applied on the second electrodes 56 are the same, and are opposite to the electric signal polarities applied on the first electrodes 55. Electric signal polarities applied on the third electrodes 58 are the same. Electric signal polarities applied on the fourth electrodes 59 are the same, and are opposite to the electric signal polarities applied on the third electrodes 58.

In the transmissive region 501, the multiple first base platforms 54 form multiple protruding platforms by etching to form gaps among the first electrodes 55 on a spacer layer. In the reflective display region 502, the multiple second base platforms 57 form multiple protruding platforms also by etching to form gaps among the third electrodes 58 on the spacer layer.

Figure 9:
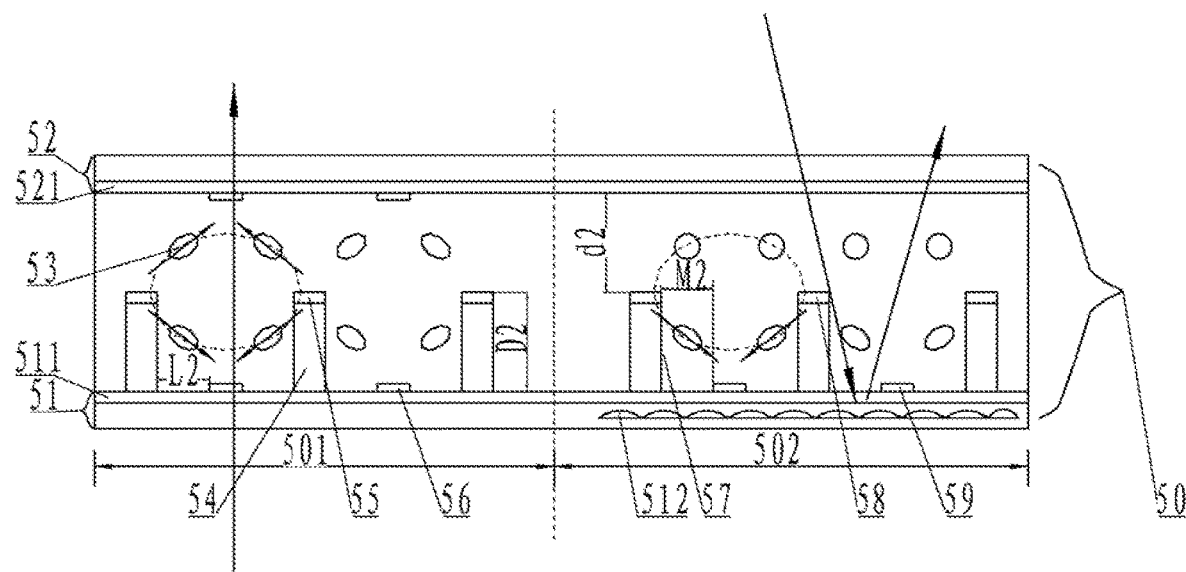
FIG. 9 is a schematic structure diagram of a blue phase liquid crystal display panel when a voltage is applied on electrodes in the fifth embodiment.

The blue phase liquid crystals 53 are evenly distributed in the display panel. When a voltage is not applied, the blue phase liquid crystal display panel 50 is in a dark state. As shown in FIG. 9, when a voltage is applied on the electrodes, an electric field is formed between the first electrode 55 and the second electrode 56 in the transmissive display region 501, and an electric field is formed between the third electrode 58 and the fourth electrode 59 in the reflective display region 502 such that the blue phase liquid crystals 53 form an optical anisotropy so as to reduce a driving voltage of the blue phase display panel. By controlling a height D2 of the first electrode 55 in the transmissive display region 501 to be within a range of −0.5 μm≤D2−d12≤0.5 μm.

Although a volume of the blue phase liquid crystals 53 filled in the reflective region 502 is almost equal to a volume of the blue phase liquid crystals 53 filled in the transmissive region 501, almost one half of the blue phase liquid crystals 53 closed to the second base 521 in the reflective display region 502 is not acted by an electric field because there are no electrodes on the second base 521, so that a phase delay of the transmissive display region 501 can be twice of a phase delay of the reflective display region 502. That is, a phase delay of an external light that passing through the reflective display region 502 from the second substrate 52, reaching the first substrate 51, being reflected back and passing through the reflective display region 502, and reaching the second substrate 52 is identical with a phase delay of a light of an internal backlight source that passing through the transmissive display region 501 from the first substrate 51 and reaching the second substrate 52. When a same voltage is applied on the transmissive display region 501 and the reflective display region 502, the transmissive display region 501 and the reflective display region 502 have a same electro-optical property.

The present embodiment can also combine with the second embodiment of the blue phase liquid crystal display panel of the present invention.

Figure 10:
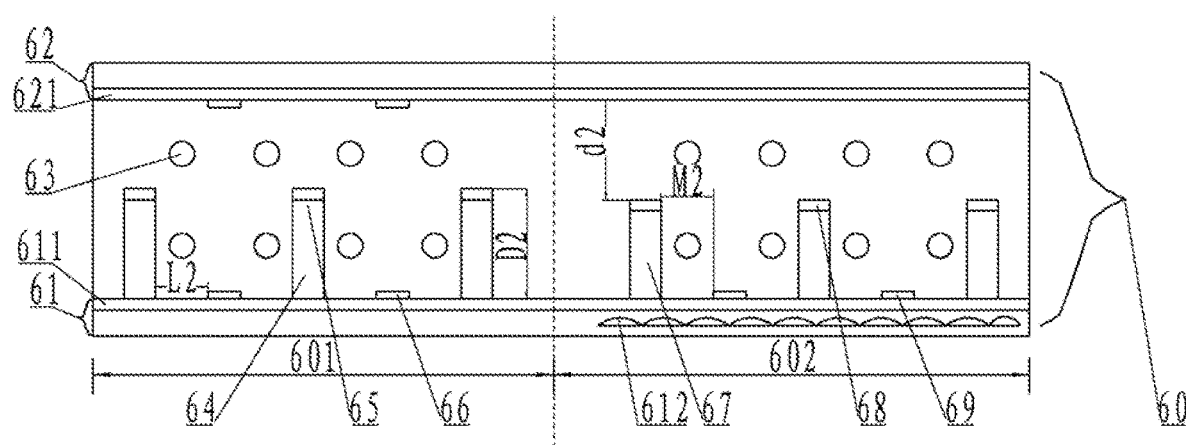
FIG. 10 is a schematic structure diagram of a blue phase liquid crystal display panel according to a sixth embodiment of the present invention.

With reference to FIG. 10, FIG. 10 is a schematic structure diagram of a blue phase liquid crystal display panel 60 according to a sixth embodiment of the present invention. The difference comparing with respect to the fifth embodiment is: electric signal polarities applied on adjacent first electrodes 65 are opposite, electric signal polarities applied on the second electrodes 66 are the same, and each second electrodes 66 is disposed between two adjacent first electrodes 65 being applied on opposite electric signal polarities. Electric signal polarities applied on adjacent third electrodes 68 are opposite. Electric signal polarities applied on the fourth electrodes 69 are the same, and each fourth electrode 69 is disposed between two adjacent third electrodes 68 being applied on opposite electric signal polarities. A distance D2 between the first electrode 65 and the first base 611 and a distance d2 between the third electrode 68 and the second base 621 have a relationship: D2 is greater than d2.

Figure 11:
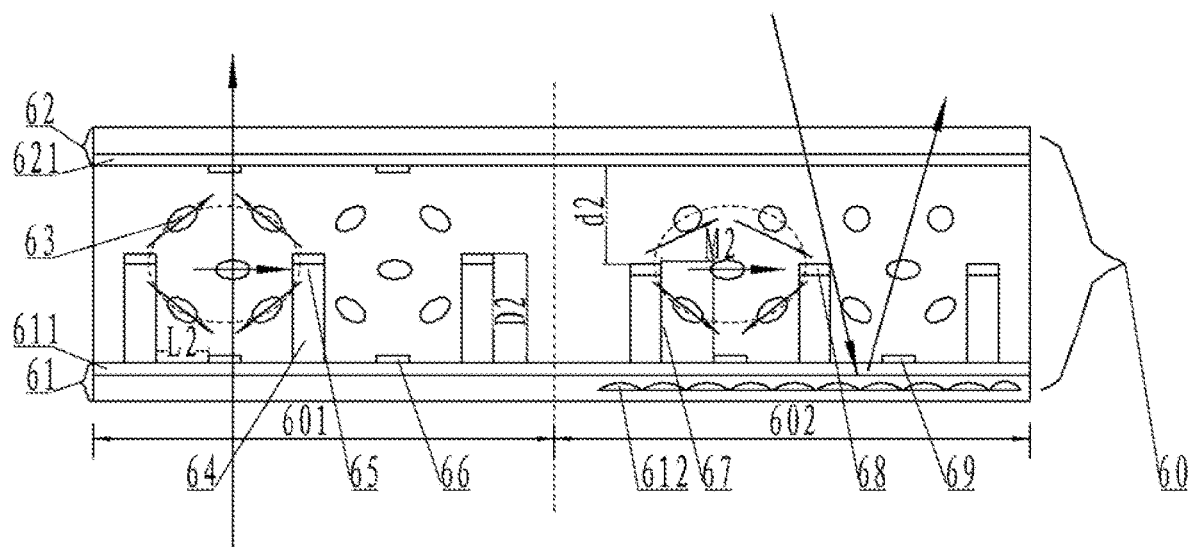
FIG. 11 is a schematic structure diagram of a blue phase liquid crystal display panel when a voltage is applied on electrodes in the sixth embodiment.

The blue phase liquid crystals 63 are evenly distributed in the display panel. When a voltage is not applied, the blue phase liquid crystal display panel 60 is in a dark state. As shown in FIG. 11, when a voltage is applied on the electrodes, an electric field is formed between the first electrode 65 and the second electrode 66 in the transmissive display region 601, an electric field is formed between adjacent first electrodes 65, an electric field is formed between the third electrode 68 and the fourth electrode 69 in the reflective display region 602, and an electric field is formed between adjacent third electrodes 68 such that the blue phase liquid crystals 63 form an optical anisotropy so as to reduce a driving voltage of the blue phase display panel.

As shown in FIG. 11, because the reflective display region 602 and the transmissive display region 601 are both filled with the blue phase liquid crystals 63 and between adjacent third electrodes 63 an electric field is also formed, an electric field strength in the reflective region (or a thickness of the blue phase liquid crystals that forms an optical anisotropy) is greater than one half of the transmissive display region 601. By controlling the distance D2 between the first electrode 65 and the first base 611 in the transmissive display region or the distance d2 between the third electrode 68 and the second base 621 to be D2 greater than d2 so as to reduce the electric field strength in the reflective display region 601 or increase the electric field strength (horizontal electric field component) in the transmissive display region 602 such that a phase delay of the transmissive display region 601 can be twice of a phase delay of the reflective display region 602. That is, a phase delay of an external light that passing through the reflective display region 602 from the second substrate 62, reaching the reflective layer 612 of the first substrate 61, being reflected back and passing through the reflective display region 602, and reaching the second substrate 62 is identical with a phase delay of a light of an internal backlight source that passing through the transmissive display region 601 from the first substrate 61 and reaching the second substrate 62. When a same voltage is applied on the transmissive display region 601 and the reflective display region 602, the transmissive display region 601 and the reflective display region 602 have a same electro-optical property.

The present invention can also adjust a horizontal spacing L2 between adjacent first electrode 55 and a second electrode 56 or a horizontal spacing M2 between adjacent third electrode 58 and fourth electrode 59 to be L2<M2 such that a phase delay of the transmissive display region 601 can be twice of a phase delay of the reflective display region 602.

The present embodiment can also combine with the second embodiment of the blue phase liquid crystal display panel of the present invention.

Figure 12:
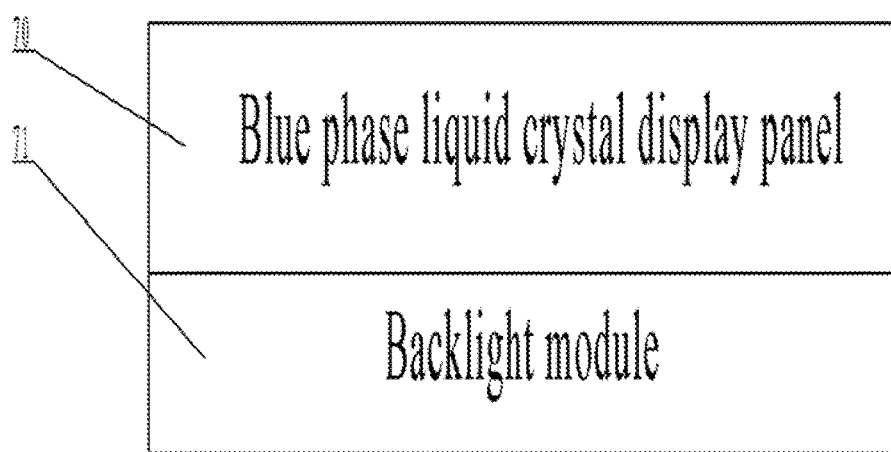
FIG. 12 is a schematic structure diagram of a liquid crystal display device according to an embodiment of the present invention.

With reference to FIG. 12, FIG. 12 is an embodiment of a liquid crystal display device of the present invention. The liquid crystal display device includes a backlight module 70 and a blue phase liquid crystal display panel 71. The backlight module 70 provides a light source to the blue phase liquid crystal display panel 71 such that after light passing through the blue phase liquid crystal display panel 71, the information is delivered to the eye of a user. The blue phase liquid crystal display panel 71 is a first embodiment of the blue phase liquid crystal display panel of the present invention or the blue phase liquid crystal display panel of any possible combination of the present invention.

In the subsequent embodiment of the liquid crystal display device of the present invention, the blue phase display panel in the liquid crystal display device is the blue phase liquid crystal display panel in the second to the sixth embodiments or any possible combinations.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A blue phase liquid crystal display panel, comprising:
   a first substrate and a second substrate which are disposed at an interval and are parallel, and blue phase liquid crystals disposed between the first substrate and the second substrate, wherein the first substrate includes a first base, the second substrate includes a second base, and the blue phase liquid crystal display panel includes a transmissive display region and a reflective display region;
   wherein the transmissive display region includes multiple first base platforms sequentially disposed at a side of the first base which is adjacent to the second substrate, each of multiple first electrodes sequentially and correspondingly disposed on each of the multiple first base platforms, and multiple second electrodes disposed on the first base and the second base, wherein the multiple first electrodes and the multiple second electrodes are disposed alternately on different horizontal planes in order to form a first horizontal electric field;

the reflective display region includes a second base platform disposed on the side of the first base which is adjacent to the second substrate, multiple third electrodes disposed on the second base platform, and multiple fourth electrodes disposed on the second base in order to form a second electric field, wherein the first substrate is provided with a reflective layer corresponding to the reflective display region; and each of the multiple first electrodes is spaced from the first base by a first distance and each of the multiple third electrodes is spaced from the second base by a second distance, which is equal to the first distance, such that when first light and second light respectively pass through the transmissive display region and the reflective display region, phase delays of the first light and the second light are identical; and wherein electric signal polarities applied on adjacent first electrodes are opposite and electric signal polarities applied on the second electrodes are the same; each of the second electrodes is disposed between two adjacent first electrodes that are applied with opposite electric signal polarities; electric signal polarities applied on adjacent third electrodes are opposite and electric signal polarities applied on the fourth electrodes are the same; and each of the fourth electrodes is disposed between two adjacent third electrodes that are applied with opposite electric signal polarities.

2. The blue phase liquid crystal display panel according to claim 1, wherein each of the multiple first base platforms is a protruding platform and the multiple second electrodes are disposed alternately with the multiple first electrodes in a horizontal direction; and the second base platform disposed on the side of the first base adjacent to the second substrate is a protruding platform, the multiple third electrodes being evenly distributed on the second base platform, the multiple fourth electrodes being disposed alternately with the third electrodes in a horizontal direction.

3. The blue phase liquid crystal display panel according to claim 2, wherein a horizontal spacing distance between adjacent first electrode and second electrode and a horizontal spacing distance between adjacent third electrode and fourth electrode are each greater than or equal to 1.5 µm.

4. A liquid crystal display device including a blue phase liquid crystal display panel, which comprises:

a first substrate and a second substrate which are disposed at an interval and are parallel, and blue phase liquid crystals disposed between the first substrate and the second substrate, wherein the first substrate includes a first base, the second substrate includes a second base, and the blue phase liquid crystal display panel includes a transmissive display region and a reflective display region;

wherein the transmissive display region includes multiple first base platforms sequentially disposed at a side of the first base which is adjacent to the second substrate, each of multiple first electrodes sequentially and correspondingly disposed on each of the multiple first base platforms, and multiple second electrodes disposed on the first base and the second base, wherein the multiple first electrodes and the multiple second electrodes are disposed alternately on different horizontal planes in order to form a first horizontal electric field;

the reflective display region includes a second base platform disposed on the side of the first base which is adjacent to the second substrate, multiple third electrodes disposed on the second base platform, and multiple fourth electrodes disposed on the second base in order to form a second electric field, wherein the first substrate is provided with a reflective layer corresponding to the reflective display region; and each of the multiple first electrodes is spaced from the first base by a first distance and each of the multiple third electrodes is spaced from the second base by a second distance, which is equal to the first distance, such that when first light and second light respectively pass through the transmissive display region and the reflective display region, phase delays of the first light and the second light are identical; and wherein electric signal polarities applied on adjacent first electrodes are opposite and electric signal polarities applied on the second electrodes are the same; each of the second electrodes is disposed between two adjacent first electrodes that are applied with opposite electric signal polarities; electric signal polarities applied on adjacent third electrodes are opposite and electric signal polarities applied on the fourth electrodes are the same; and each of the fourth electrodes is disposed between two adjacent third electrodes that are applied with opposite electric signal polarities.

5. The liquid crystal display according to claim 4, wherein each of the multiple first base platforms is a protruding platform and the multiple second electrodes are disposed alternately with the multiple first electrodes in a horizontal direction; and the second base platform disposed on the side of the first base adjacent to the second substrate is a protruding platform, the multiple third electrodes being evenly distributed on the second base platform, the multiple fourth electrodes being disposed alternately with the third electrodes in a horizontal direction.

6. The liquid crystal display according to claim 4, wherein a horizontal spacing distance between adjacent first electrode and second electrode and a horizontal spacing distance between adjacent third electrode and fourth electrode are each greater than or equal to 1.5 µm.

* * * * *